2,902,382

RESINOUS MATERIALS PLASTICIZED WITH A METHOXYBENZENE DICARBOXYLIC ACID ESTER

Charles A. Burkhard, Alplaus, N.Y., assignor to General Electric Company, a corporation of New York No Drawing. Application April 13, 1956
Serial No. 577,961

10 Claims. (Cl. 106—181)

This invention relates to a new class of aromatic esters and to materials plasticized therewith. More particularly, this invention is concerned with higher alcohol esters of alkoxybenzene dicarboxylic acids and with vinyl and cellulose ester plastic materials plasticized therewith.

In order to plasticize properly a coating and film-forming material, such as polyvinyl chloride, cellulose nitrate, cellulose acetate, cellulose acetate-butyrate, etc., such material and the plasticizer must be mutually miscible over a wide range of temperatures. Furthermore, the plasticizer must remain unchanged in the material on exposure to air or elevated temperatures if the plasticized composition is to be sufficiently permanent for commercial utilization. If the plasticizer is immiscible with the plastic material it is impossible to provide a clear plastic material since the immiscible plasticizer will tend to cause a "blush" in the plastic material. If the plasticizer is miscible but not stable in the plastic composition, it is found that the plasticizer will tend to "bleed" from the plastic material resulting in a material which is brittle or otherwise deteriorated.

The use of a number of different plasticizer materials is suggested by the prior art. However, although plasticizers which are extremely miscible with plastic materials are known and plasticizers which are quite stable are known, a plasticizer containing both of these properties in the degree desired is not known. Thus, the prior art materials are not satisfactory as plasticizers which eliminate both "blush" and "bleeding."

The present application is based on my discovery of a new class of materials, namely, the octyl to lauryl diesters of alkoxybenzene dicarboxylic acids, sometimes referred to hereinafter as "diesters." This application is based further on my discovery that these esters are excellent plasticizers for vinyl and ester materials of the class described, being very miscible with the plastic materials while at the same time being extremely resistant to deterioration. Thus, by the present invention I provide plasticized compositions which are not subject to the "blush" or "bleeding" of prior art plasticized materials.

The ester materials of the present invention may be described by the following formula (1) 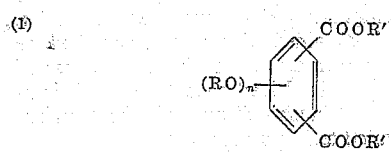

where R is a lower alkyl radical, e.g., an alkyl radical having from 1 to 8, and preferably from 1 to 4, carbon atoms, such as methyl, ethyl, propyl, isopropyl, butyl, sec-butyl, etc. radicals; R' is an alkyl radical containing from 8 to 12 carbon atoms, e.g., n-octyl, 2-ethylhexyl, n-nonyl, n-decyl, n-undecyl, n-lauryl, etc. radicals; and $n$ is an integer equal to from 1 to 3, inclusive. The preferred group of esters within the scope of Formula 1 are those represented by the following formula (2) 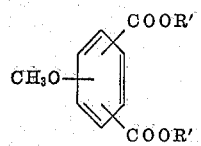

where R' is as defined above. Thus it is seen that the preferred class of materials within the scope of this invention are the dioctyl to dilauryl esters of methoxybenzene dicarboxylic acids. Specific examples of acids from which these octyl to lauryl esters may be formed include, for example, methoxyterephthalic acid, 2-methoxyisophthalic, 4-methoxyisophthalic acid, 5-methoxyisophthalic acid, 3-methoxyphthalic acid, 4-methoxyphthalic acid, 2,4-dimethoxyisophthalic acid, 4,6-dimethoxyisophthalic acid, ethoxyterephthalic acid, n-butoxyterephthalic acid, etc.

The diesters described in Formula 1 or 2 may be prepared in conventional methods from the corresponding acids which are known in the art. Thus, the acid is heated with the desired alcohol in the presence of a suitable solvent and a catalyst to form the diester. In the case of diesters of 4-methoxyisophthalic acid, for example, the acid is mixed with the desired alcohol such as 2-ethylhexanol in the presence of a solvent such as xylene and in the presence of a catalyst such as sulfuric acid. After this mixture is heated for several hours, esterification will have taken place yielding bis-2-ethylhexyl 4-methoxyisophthalate.

The materials which may be plasticized with the diesters of this invention are those plastic materials which are commonly plasticized to induce flexibility. In particular, these esters are valuable plasticizers for vinyl and cellulose ester compositions such as, for example, polyvinyl chloride, cellulose acetate, cellulose acetate butyrate, cellulose nitrate, ethyl cellulose, polymethyl methacrylate, polyvinyl acetate, polyvinyl butyral, etc.

The plasticized compositions of the present invention may be prepared by several different methods. For example, the diester may be incorporated into the plastic composition by heating the plastic material to a temperature at which it exhibits flow properties and then milling the plasticizer into the warm plastic material on conventional plastic milling rolls. In addition, the diester may be incorporated into the plastic material by forming a solution of the plastic material and the diester in a suitable solvent and then evaporating the solvent. The particular solvent employed, of course, varies with the particular plastic material employed. Where the plastic material is cellulose nitrate, a suitable solvent is a mixture of an ether and an alcohol such as a mixture of diethyl ether and ethanol. Where the material being plasticized is a cellulose ester of an organic acid, suitable solvents include ketones, such as acetone or methyl ethyl ketone.

When the plasticizer is incorporated into the plastic film by milling the material at an elevated temperature, the temperature may vary within wide limits, the only requirement being that the plastic material be soft enough to be milled while not being so soft that it flows off of the milling rolls. Thus, I have found that milling temperatures of from about 85–135° C. are satisfactory.

When the plasticizer is incorporated into the plastic material by dissolving both the plasticizer and the plastic material in a suitable solvent, the amount of solvent employed may again vary within extremely wide limits. The minimum amount of solvent desirable is that amount required to dissolve both the plasticizer and the plastic material. There is no upper limit to the amount of solvent required except that there is no need to use more solvent than that required for solution.

The amount of the diester plasticizer which may be incorporated into the plastic materials of the present invention may also vary within wide limits. Thus, suitable plasticized compositions can be prepared employing from about 5 to 50 percent by weight of plasticizer based on the weight of the plasticized composition. In the preferred embodiment of my invention I employ about 25 to 40 percent by weight of plasticizer. When using these preferred ratios, the resulting materials exhibit good flexibility at both elevated temperatures and low temperatures, are free from "blush" and there is no tendency for the plasticizer to "bleed" from the plastic material at elevated temperatures.

After incorporating the plasticizer into the plastic composition, the resulting product may be molded, extruded, or rolled into the form in which the plasticized composition is to be used. Where the plasticizer is added to the plastic composition with the use of a solvent, the plasticized composition may also be cast into the form in which it is to be used. Where molding, extruding, or rolling operations are employed to form the finished products, it is advantageous to carry out these operations at a temperature above the softening point of the plasticized composition. Generally, this temperature is in the range of about 100–160° C. for commercial plastic materials.

In evaluating plasticized compositions, it is customary to measure or observe a number of properties of the material. Thus, the question of "blush" caused by the plasticizer is answered by examining the plasticized composition to see if the plasticized composition exhibits areas of discoloration. Where these areas appear the plasticizer is not completely compatible with the plastic resin. The stability of the plasticizer is determined by maintaining the plasticized composition at an elevated temperature for a given period of time and measuring the loss of plasticizer. Thus, in one standard test, the plasticized composition is maintained at a temperature of 125° C. for three hours and the percent weight loss of plasticizer during this three hour period is measured. Other important properties of the plastic material are its tensile strength, its percent elongation before rupture, and the lowest temperature at which the plasticized composition exhibits flexibility. For plastic materials plasticized with the diesters of the present invention, it is found that the loss of plasticizer is less than one-half of the comparable loss of the conventional plasticizers known in the art. The plasticizers of this invention exhibit no adverse effect on the tensile strength, percent elongation or low temperature flexibility of the plasticized materials.

The following examples are illustrative of the practice of my invention and are not intended for purposes of limitation. All parts are by weight.

EXAMPLE 1

Bis-2-ethylhexyl 4-methoxyisophthalate was prepared by heating a mixture of 10 parts of 4-methoxyisophthalic acid, 25 parts of 2-ethylhexanol, 65 parts of commercial mixed xylenes, and 0.75 part of concentrated sulfuric acid. This mixture was heated at a gentle reflux and the water was removed as an azeotrope as it was formed. Distillation of the reaction product yielded bis-2-ethylhexyl 4-methoxyisophthalate which was a light yellow oil having a boiling point of 225° C. at 1 mm. and a refractive index $n_D^{20}$ 1.4990. Chemical analysis of this material showed it to contain 71.5 percent carbon and 9.9 percent hydrogen as compared with the theoretical values of 71.39 percent carbon and 9.59 percent hydrogen. Two parts of this ester were mixed with 3 parts of polyvinyl chloride by milling the two ingredients together at 120° C. until a homogeneous material was obtained. The polyvinyl chloride employed was Geon 101, B. F. Goodrich Chemical Company. As a control, another plasticized polyvinyl chloride sheet was formed employing 2 parts of tricresyl phosphate with 3 parts of polyvinyl chloride. Tricresyl phosphate was used as a control since tricresyl phosphate is reported as the best known plasticizer for polyvinyl chloride. Both of these plasticized compositions were molded into 75 mil sheets at a temperature of 150° C. A portion of each of the sheets was then heated at 125° C. for three hours to determine the loss of plasticizer. The tensile strength and percent elongation before rupture and the low temperature flexibility of the sheets were also measured. This examination showed that the bis-2-ethylhexyl 4-methoxyisophthalate plasticized polyvinyl chloride lost only 0.18 percent by weight of its plasticizer in three hours at 125° C. The tricresyl phosphate plasticized sheet lost over three times this amount of plasticizer. Specifically the loss was 0.58 percent by weight of plasticizer. The tensile strength of both sheets was of the order of 2500 pounds per square inch and both sheets elongated about 300 percent before rupturing. Both sheets were flexible at a temperature as low as −40° C. Thus, it is seen that polyvinyl chloride plasticized with bis-2-ethylhexyl 4-methoxyisophthalate exhibits mechanical and low temperature properties equivalent to tricresyl phosphate plasticized sheets while being more stable at elevated temperatures. In addition, the bis-2-ethylhexyl 4-methoxyisophthalate plasticized sheet was much clearer than the tricresyl phosphate plasticized sheet.

EXAMPLE 2

This example illustrates the preparation of a polyvinyl chloride composition containing a lower alkyl diester of an alkoxybenzene dicarboxylic acid as distinguished from the octyl to lauryl diesters of the present invention. Diethyl 4-methoxyisophthalate was prepared by mixing 4-methoxyisophthalic acid with excess thionyl chloride and several drops of anhydrous pyridine and heating the mixture for about 18 hours at reflux, removing hydrogen chloride and sulfur dioxide as it was formed. The reaction mixture was then subjected to a flash distillation to dryness, after which time anhydrous benzene was added and the mixture was again distilled rapidly to dryness. Excess absolute ethanol was added and the mixture was heated at reflux for 2 hours, and then drowned in water to give diethyl 4-methoxyisophthalate. This material (2 parts) was mixed with 3 parts of Geon 101 polyvinyl chloride and the resulting product was pressed into a sheet at 150° C. When a portion of this sheet was maintained for 3 hours at 125° C. more than 26 percent by weight of the plasticizer was lost. Thus, it is seen that a polyvinyl chloride sheet plasticized with diethyl 4-methoxyisophthalate loses plasticizer at a rate more than 100 times as great as the rate of loss of plasticizer from a bis-2-ethylhexyl 4-methoxyisophthalate plasticized polyvinyl chloride material.

EXAMPLE 3

Dioctyl 4-methoxyphthalate can be formed by mixing 10 parts of 4-methoxyphthalic acid, 20 parts of n-octanol, 70 parts of xylene, and 1 part of concentrated sulfuric acid and heating the mixture for 4 hours at reflux. Distillation of the reaction product will yield dioctyl 4-methoxyphthalate. One part of this dioctyl ester can be mixed with 9 parts of Geon 101 polyvinyl chloride on milling rolls at a temperature of about 125° C. until a homogeneous sheet is obtained. This sheet can then be pressed at 150° C. to form a sheet having a thickness of 75 mils. The resulting plasticized sheet will be clear in appearance, exhibit no "blushing" and will be resistant to "bleeding" at elevated temperatures.

EXAMPLE 4

Didecyl methoxyterephthalate is prepared by heating for 4 hours at reflux a mixture of 10 parts of methoxyterephthalic acid, 30 parts of n-decanol, 80 parts of xylene and 2 parts of concentrated sulfuric acid. Distillation of this reaction mixture yields didecyl methoxyterephthalate. One part of this didecyl ester is mixed with 1 part of polyvinyl chloride (Geon 101) on milling rolls at a temperature of about 105° C. The resulting plasticized composition is then formed into a sheet by molding at 160° C. The resulting sheet will exhibit good low temperature flexibility, is clear in appearance, and will exhibit very little "bleeding" at elevated temperatures.

EXAMPLE 5

Dioctyl 4-methoxyisophthalate was prepared by heating at reflux a mixture of 50 parts of 4-methoxyisophthalic acid, 80 parts of 1-octanol, 130 parts of xylene, and 1.5 parts of concentrated sulfuric acid. After the removal of the theoretical amount of water from the reaction mixture, 10 parts of calcium carbonate was added to remove the sulfuric acid. After filtering the mixture, the filtrate was distilled giving pure dioctyl 4-methoxyisophthalate which boiled at 233° C. at 1 mm. and had a refractive index $n_D^{20}$ 1.4970. Chemical analysis of this ester showed the presence of 70.7 percent by weight of carbon and 9.5 percent by weight of hydrogen as compared with the theoretical values of 71.39 percent carbon and 9.59 percent hydrogen. Two parts of this ester were milled with 3 parts of polyvinyl chloride (Geon 101) until a homogeneous mixture was obtained and the resulting mixture was pressed into a 75 mil sheet at a temperature of 150° C. The resulting sheet showed a loss of 0.25 percent by weight of the plasticizer when maintained for 3 hours at 125° C. The tensile strength, percent elongation, and low temperature flexibility of the sheet were measured. These properties are listed in Table I which follows Example 6.

EXAMPLE 6

Dilauryl 4-methoxyisophthalate was prepared by heating at reflux a mixture of 20 parts of 4-methoxyisophthalic acid, 50 parts of lauryl alcohol, 130 parts of xylene and 1.5 parts of concentrated sulfuric acid. After removal of water from the reaction mixture, calcium carbonate was added to precipitate the sulfuric acid. Distillation of the filtrate yielded dilauryl 4-methoxyisophthalate which boiled at 297–303° C. at 1.5 mm. Chemical analysis of this diester showed the presence of 74.4 percent by weight of carbon and 11.1 percent by weight of hydrogen as compared with the theoretical values of 74.39 percent carbon and 10.59 percent hydrogen. Two parts of this diester were mixed with 3 parts of polyvinyl chloride (Geon 101) on milling rolls at 125° C. This resulted in a homogeneous material which was molded into a 75 mil sheet at 150° C. This sheet was clear and exhibited no significant "blushing." When a portion of this sheet was maintained at 125° C. for three hours only 0.28 percent by weight of the plasticizer was lost indicating that the plasticized composition was very resistant to bleeding at elevated temperatures. The tensile strength, percent elongation and low temperature flexibility properties of this material are listed below.

The following table correlates the properties obtained with the tricresyl phosphate plasticized sheet of Example 1, the bis-2-ethylhexyl 4-methoxyisophthalate plasticized sheet of Example 1, the dioctyl 4-methoxyisophthalate plasticized sheet of Example 5, and the dilauryl 4-methoxyisophthalate plasticized sheet of Example 6.

*Table I*

|  | Tricresyl Phosphate | 4-Methoxyisophthalate Diesters | | |
| --- | --- | --- | --- | --- |
|  |  | n-octyl | 2-ethyl-hexyl | lauryl |
| Plasticizer Loss, percent 3 hours at 125° C | 0.58 | 0.25 | 0.18 | 0.28 |
| Tensile Strength, p.s.i | 2,846 | 2,370 | 2,580 | 1,780 |
| Elongation, percent | 300 | 300 | 300 | 300 |
| Cold Temperature flex., °C | −40 | −55 | −40 | −50 |

EXAMPLE 7

This example illustrates the plasticizing of cellulose nitrate with the diesters of the present invention. Three parts of cellulose nitrate was dissolved in 39 parts of a mixture of equal parts by weight of diethyl ether and ethanol. One part of dioctyl 4-methoxyisophthalate was then added to the solution and the solution was cast on a clean mercury surface and the solvents were allowed to evaporate at room temperature. This same procedure was repeated with bis-2-ethylhexyl 4-methoxyisophthalate and dilauryl 4-methoxyisophthalate. In each case the plasticized film was very flexible and no appreciable "blush" was observed.

EXAMPLE 8

This example illustrates the plasticization of cellulose acetate with the diesters of the present invention. Three parts of a commercial cellulose acetate plastic material were dissolved in 36 parts of methyl ethyl ketone. Dioctyl 4-methoxyisophthalate (1 part) was added to this solution and the resulting solution was cast on a mercury surface and the solvents were allowed to evaporate at room temperature. This same procedure was followed employing bis-2-ethylhexyl 4-methoxyisophthalate and dilauryl 4-methoxyisophthalate as a plasticizer. The resulting three sheets were all examined and found to exhibit no significant amount of "blush" and were very flexible.

EXAMPLE 9

This example illustrates the plasticization of cellulose acetate butyrate with the novel diesters of the present invention. Three parts by weight of a commercial cellulose acetate butyrate plastic were dissolved in 36 parts of methyl ethyl ketone. One part of dioctyl 4-methoxyisophthalate was added to this solution and the resulting solution was cast on a mercury surface. Following the same procedure and with the same proportions of ingredients, bis-2-ethylhexyl 4-methoxyisophthalate and dilauryl 4-methoxyisophthalate were also used as plasticizers for this cellulose acetate butyrate material. In each case the resulting films were free of "blush" and exhibited good flexibility while maintaining a high tensile strength.

Although the foregoing examples have not illustrated the preparation of all of the alkoxybenzene dicarboxylic acid esters within the scope of Formula 1 or 2, it should be understood that all of these esters may be prepared from the corresponding acids by the methods outlined in the examples. Furthermore, it should be understood that all of the acids within the scope of Formula 1 or 2 may be employed as plasticizers in various plasticizable resinous compositions.

In addition to the four specific plasticizable resinous compositions described in the examples, it should be understood that any type of plasticizable composition may be employed in preparing the plasticized compositions of this invention. In addition to employing plasticizable compositions composed of one polymer, it should be understood that copolymers of various plasticizable or plasticizable with non-plasticizable compositions may be employed. Thus, copolymers of vinyl chloride and other unsaturated materials copolymerizable therewith may be plasticized with the alkoxybenzene dicarboxylic acid esters in accordance with this invention. For example, copolymers of vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl methacrylate, ethyl acrylate, propyl acrylate, butyl acrylate, allyl acrylate and corresponding esters of methacrylic acids; vinyl aromatic compounds, for example, styrene, o-chlorostyrene, p-chlorostyrene, 2,5-dichlorostyrene, 2,4-dichlorostyrene, p-ethylstyrene, divinyl benzene, vinyl naphthalate, α-methyl styrene; dienes, such as butadiene, chloroprene;

amides such as acrylic acid amide, acrylic acid anilide; nitriles, such as acrylic acid nitriles; esters of α,β-unsaturated carboxylic acids, for example, the methyl, ethyl, propyl, butyl, amyl, hexyl, heptyl, octyl, allyl, methylallyl, and phenyl esters of maleic, crotonic, itaconic, fumaric acids and the like. Where copolymers of vinyl chloride are employed, it is preferred that the copolymeric composition be prepared from at least 50 percent by weight of the vinyl chloride monomer.

In addition to using the plasticizable compounds in their pure state, these compositions may also be modified by the incorporation of typical fillers, for example, silica aerogel, carbon black, talc, etc. In addition, various coloring agents and stabilizers may also be included.

The octyl to lauryl esters of the alkoxybenzene dicarboxylic acids within the scope of Formula 1 or 2 are useful per se as plasticizers for plasticizing compositions, as lubricating agents, as hydraulic fluids, as diffusion pump fluids, as heat transfer fluids, etc. The plasticized compositions of this invention exhibit the same utility as other plasticized compositions with the additional advantage that the compositions of the present invention may be employed at elevated temperature without danger of "bleeding" of the plasticizer from the plastic material. Thus, the plasticized compositions of the present invention may be used in the form of sheets, for example, as wrapping paper, protective films and the like. These plasticized materials may also be molded into various articles of commerce such as containers and housings for electrical apparatus, etc.

What I claim as new and desire to secure by Letters Patent of the United States is:

1. A plasticized composition of matter comprising a plasticizable resinous material selected from the class consisting of polyvinyl chloride, cellulose acetate, cellulose nitrate, cellulose acetate butyrate, ethyl cellulose, polymethyl methacrylate, polyvinyl acetate, and polyvinyl butyral and a methoxybenzene dicarboxylic acid ester having the formula

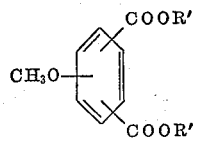

where R' is an alkyl radical having from 8 to 12, inclusive, carbon atoms.

2. A composition of matter comprising polyvinyl chloride resin having incorporated therein bis-2-ethylhexyl 4-methoxyisophthalate.

3. A plasticized composition of matter comprising polyvinyl chloride resin having incorporated therein dioctyl 4-methoxyisophthalate.

4. A plasticized composition of matter comprising polyvinyl chloride resin having incorporated therein dilauryl 4-methoxyisophthalate.

5. A plasticized composition of matter comprising polyvinyl chloride resin having incorporated therein a methoxybenzene dicarboxylic acid ester having the formula

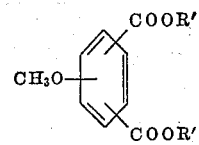

where R' is an alkyl radical having from 8 to 10 carbon atoms.

6. A plasticized composition of matter comprising cellulose acetate resin having incorporated therein bis-2-ethylhexyl 4-methoxyisophthalate.

7. A plasticized composition of matter comprising cellulose acetate butyrate resin having incorporated therein bis-2-ethylhexyl 4-methoxyisophthalate.

8. A plasticized composition comprising a plasticizable resinous material selected from the class consisting of polyvinyl chloride, cellulose acetate, cellulose nitrate, cellulose acetate butyrate, ethyl cellulose, polymethyl methacrylate, polyvinyl acetate, and polyvinyl butyral, and an alkoxybenzene dicarboxylic acid ester having the formula

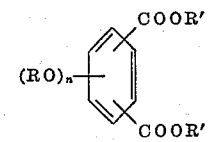

where R is a lower alkyl radical of from 1 to 8 carbon atoms, R' is an alkyl radical containing from 8 to 12, inclusive, carbon atoms, and $n$ is an integer equal to from 1 to 3, inclusive.

9. A plasticized composition of matter comprising polyvinyl chloride resin having incorporated therein an alkoxybenzene dicarboxylic acid having the formula

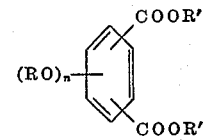

where R is a lower alkyl radical of from 1 to 8 carbon atoms, R' is an alkyl radical containing from 8 to 12, inclusive, carbon atoms, and $n$ is an integer equal to from 1 to 3, inclusive.

10. A composition of matter comprising resinous cellulose nitrate having incorporated therein dioctyl 4-methoxyisophthalate.

References Cited in the file of this patent

UNITED STATES PATENTS

| | | |
|---|---|---|
| 2,176,070 | Grether et al. | Oct. 17, 1939 |
| 2,389,959 | Dean | Nov. 27, 1945 |
| 2,410,685 | Salo et al. | Nov. 5, 1946 |
| 2,465,317 | Mowry et al. | Mar. 22, 1949 |